United States Patent [19]

Tinsley

[11] 4,250,734
[45] Feb. 17, 1981

[54] WIRE GRIPPING DEVICES

[75] Inventor: William W. Tinsley, Ross-on-Wye, England

[73] Assignee: Bartin Limited, Ross-on-Wye, England

[21] Appl. No.: 25,455

[22] Filed: Mar. 29, 1979

[30] Foreign Application Priority Data

Mar. 30, 1978 [GB] United Kingdom ............... 12387/78

[51] Int. Cl.³ ................................................ B21C 1/28
[52] U.S. Cl. ............................................ 72/422; 72/287; 72/290; 24/136 R; 24/263 B
[58] Field of Search .................. 72/290, 287, 422, 423; 24/115 M, 136 R, 263 B, 263 SW; 81/355, 362, 363; 294/100, 102 R, 103 R; 254/76; 269/228

[56] References Cited

U.S. PATENT DOCUMENTS

| 801,377 | 10/1905 | Hardesty | 24/136 R |
|---|---|---|---|
| 1,702,359 | 2/1929 | Molmark | 24/136 R |
| 2,502,804 | 4/1950 | Spencer | 269/228 |
| 2,599,174 | 6/1952 | Hauser | 269/228 |
| 2,699,698 | 1/1955 | Adams | 81/363 |
| 4,068,608 | 1/1978 | Hartz | 24/136 R |

Primary Examiner—Lowell A. Larson
Attorney, Agent, or Firm—Young & Thompson

[57] ABSTRACT

A drawing-in dog for a wire drawing machine has gripping surfaces formed on two opposed wedge members. Both wedge members are slideably mounted in a housing which tapers towards the aperture through which the wire is to be inserted. One wedge member is coupled by a toggle link to a lever pivoted on the housing, whereby the wedge member may be moved between a released position and a position where it is urged by the lever and toggle link into positive gripping engagement with the wire. The other wedge member is freely slideable so as to enable the dog to accommodate wire of a range of diameters.

9 Claims, 4 Drawing Figures

WIRE GRIPPING DEVICES

This invention relates to releasable wire gripping devices, and provides an arrangement whereby positive gripping of the wire may be effected. The invention has particular but not exclusive application to the provision of drawing-in dogs for wire drawing machines.

In a wire drawing machine, the wire is drawn through a die and wound on to a capstan or drawing block. At the start of the drawing of a length of wire, the diameter of a short length of the end of the stock material from which the wire is to be drawn is reduced sufficiently for such end to pass through the die. The end projecting through the die is then gripped by a drawing-in dog which is connected, for example by a chain, to a fixture on the perimeter of the drawing block. There is considerable energy stored in the coil of wire on the drawing block during a drawing operation with the result that, if the wire should break or the dog become detached from the wire, the resulting free end will fly loose with considerable force, thus presenting a major hazard to operating personnel. For this reason, it is desirable for the die stand and drawing block to be surrounded by guards and to provide interlocking controls so that the drawing block cannot rotate in the drawing-in direction when the guards are open.

Existing drawing-in dogs commonly consist of a body portion having a tapering passageway extending therethrough and a sliding wedge arranged to engage with one of the tapering walls of the passageway, the wire being gripped between the wedge and the opposite wall of the passageway. In some dogs, two such wedges are arranged to slide against opposite walls of the passageway and to grip the wire therebetween. These dogs suffer from the disadvantage that the full gripping force is not exerted by the wedges until after drawing tension has been applied to the wire. This sometimes leads to the dog pulling off the wire as the tension is applied. In order to overcome this problem, such wedges are commonly spring-biased into the wire engaging position. However, the maximum acceptable thrust to be imparted by such springs is limited by the need to permit the wedge surfaces to be displaced manually during insertion of the end of the wire and in practice such springs exert insufficient force to ensure reliable engagement with all types of wire. In addition, whether biasing springs are used or not, the binding forces produced during drawing are such that it is necessary to hit the dog or wedge with a hammer in order to release the wire therefrom. The present invention is concerned with the provision of a wire gripping device, suitable for use as a drawing-in dog, in which a positive gripping action is applied to the wire, so that the foregoing disadvantages do not arise.

According to the invention, a releasable wire gripping device, for positive gripping of a wire, comprises a body portion having a passageway extending therethrough, one wall of the passageway being disposed substantially parallel to the opposite wall thereof and being formed by a wedge member which is displaceable longitudinally of the passageway so as to vary the effective width thereof between a first width when the wedge member is in a first position and a second wider width when the wedge member is in a second position, and a lever pivotally mounted on the body portion and operatively connected to the wedge member by coupling means so located relative to the pivotal mounting of the lever that, when the wedge member is in its first position, thrust thereon tending to move it into its second position does not exert a couple on the lever in such a sense as to cause angular movement thereof to permit movement of the wedge member towards its second position.

Two embodiments of the invention will now be described, by way of example, with reference to the accompanying drawings, in which.

Figure 1:
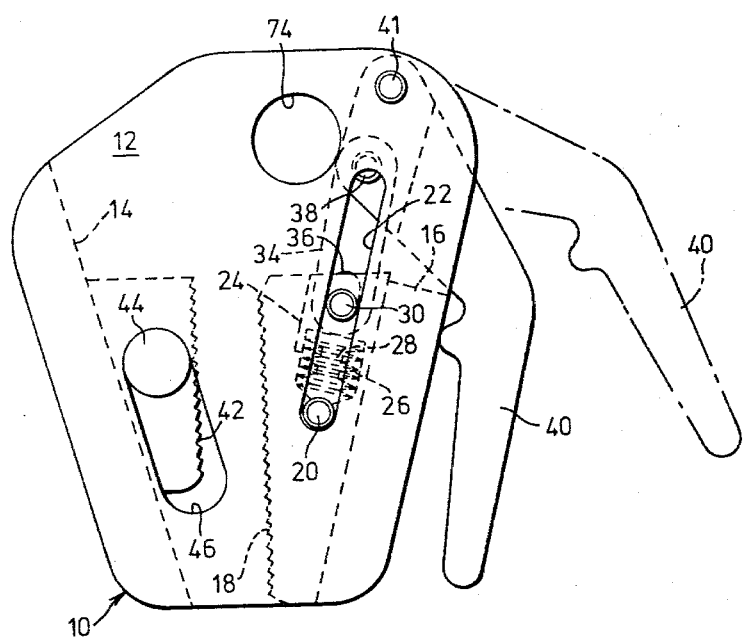
FIG. 1 is a side view of a drawing-in dog in accordance with the invention.

Referring to FIG. 1, the body portion of a drawing-in dog 10 comprises first and second parallel side plates 12 held in spaced apart relation by spacer members 14 and 16 which together define a tapering passageway. A first wedge member 18 is located for sliding movement in abutment with the spacer member 16. A pin 20 projects laterally through the wedge member 18 and engages in slots 22 in the side plates 12.

The wedge member 18 has a recess 24 in its thicker end, the recess containing a spring assembly in the form of a stack of disc springs (Belleville washers) 26 mounted on a rod 28 which extends between the pin 20 and a second pin 30 which is also mounted on the wedge member 18 and projects through the slot 22. A toggle link 34 has an elongate hole 36 at one end. This end of the link 34 bears against the stack of Belleville washers 26 and the other end thereof is connected by a pivot pin 38 to an operating lever 40 which is pivotally mounted on the side plates 12 by a further pivot pin 41.

Thus movement of the lever 40 from the position shown in solid lines to the position shown in chain dotted lines causes displacement of the first wedge member upwardly as viewed in FIG. 1, thereby increasing the effective width of the passageway.

A second wedge member 42 is located on the opposite side of the passageway for abutment with the spacer member 14. The wedge member 42 has a guide pin 44 fast therewith, the pin 44 projecting through slots 46 in the side plates 12. Thus, sliding movement of the second wedge member 42 enables the width of the passageway to be adjusted for different sizes of the wire.

In use, the end of a wire is inserted into the passageway from the bottom, as viewed in FIG. 1, with the lever 40 in the position shown in chain dotted lines. The wedge member 42 is moved downwardly until the wire is in engagement with the confronting surfaces of both wedge members 18 and 42. The lever 40 is then swung clockwise into the position shown in solid lines so that the toggle link 34 compresses the Belleville washer stack 26. The wire is thus firmly clasped between the wedges 18 and 42 as a result of the spring action of the Belleville washers acting between the link 34 and the pin 20 on the wedge 18. As can be seen in FIG. 1, the toggle link 34 is then slightly over-centre so that any upward thrust on the wedge 18, tending to move it away from the wire, will not exert an anti-clockwise couple on the operating lever 40, which would cause anti-clockwise swinging movement thereof and upward movement of the wedge 18, but, on the contrary, exerts a clockwise couple on the lever 40, through the toggle link 34, so that the lever remains locked in the solid line position. The confronting surfaces of the two wedge members 18 and 42 are serrated so as to increase the grip on the wire.

It may be that, in use, tension applied to the wire could cause further downward movement (as viewed in FIG. 1) of the wedge member 42 but, should this take place, the Belleville washers 26 and the elongate hole 36 in the toggle link 34 allow simultaneous downward movement of the wedge member 18 so that the grip on the wire is increased.

When it is desired to release the wire, the lever 40 is moved back to the position shown in chain dotted lines to displace the wedge member 18 back into a position in which the wire is released. The mechanical advantage provided by the lever is usually sufficient to enable this releasing operation to be performed manually but, if the wire has bound particularly tightly into the dog or it is desired to effect release from a distance, for example by reaching over the top of the guard of a wire drawing machine, a length of tubing may be fitted over the lever 40 and used to effect release.

Figure 2:
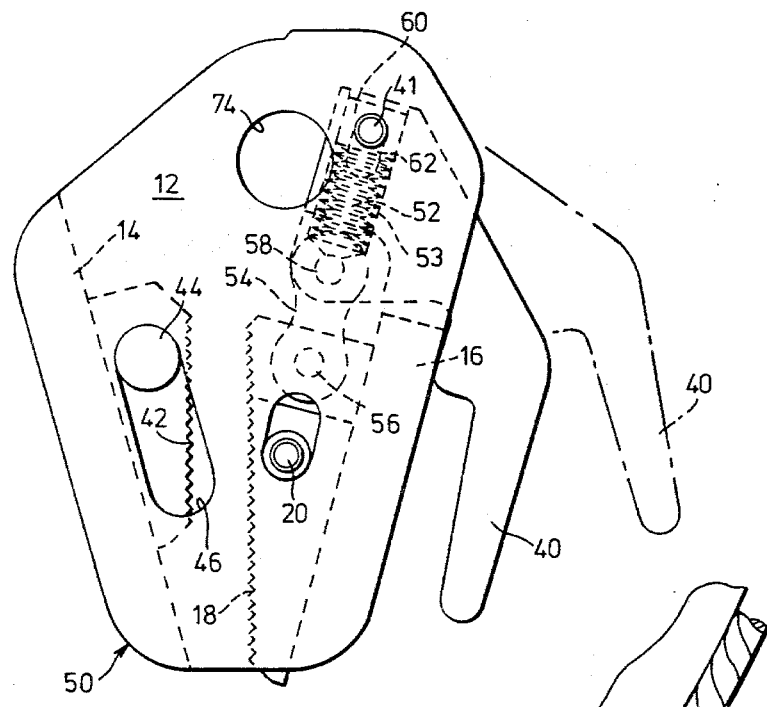
FIG. 2 is a side view of a drawing-in dog in accordance with another embodiment of the invention.

FIG. 2 illustrates an alternate pulling-in dog 50, which differs from the dog 10 in that a pivotal link 54 is directly connected between the lever 40 and the wedge member 18. The link 54 is connected to the wedge member 18 by a pivot pin 56 and to the lever 40 by a pivot pin 58. In this arrangement the lever 40 is mounted on the pivot pin 41 by means of an elongate slot 62 in the lever. A stack of Belleville washers 52 is located in a recess 53 in the operating lever 40 and acts between the bottom of the recess and a block 60 mounted on the pivot pin 41, within the recess. Thus, when the lever 40 is moved into the position shown in solid lines in FIG. 2, the wire between the wedge members 18 and 42 is firmly clasped by the spring action of the Belleville washers acting between the lever 40 and the block 60. In this position the link 54 is slightly over-centre so that, as in the dog of FIG. 1, any upward thrust on the wedge member 18 exerts a clockwise couple on the operating lever 40, and the lever therefore remains locked.

The dimensions of the components may be such that the lever 40 and toggle link 54 apply a direct thrust to the wedge 18 during the final portion of travel as the toggle goes over-centre. This causes the serrations on the wedge members to bite into the wire under positive pressure.

It will be appreciated that other forms of spring means, such as coil springs or rubber blocks, may be used instead of the disc springs illustrated. Also, the spring means may be mounted in the main body of the dog in a manner to impart the required resilient thrust to the wedge in the operative position of the lever 40.

The wedge member 42 may also be spring-loaded downwardly in either of the described arrangements.

Figure 3:
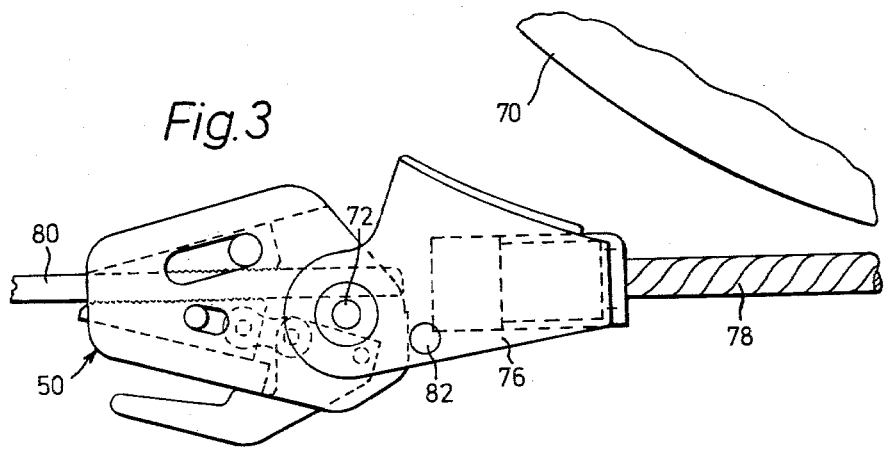
FIGS. 3 and 4 illustrate the use of the dog shown in FIG. 2 on a wire drawing machine.
Figure 4:
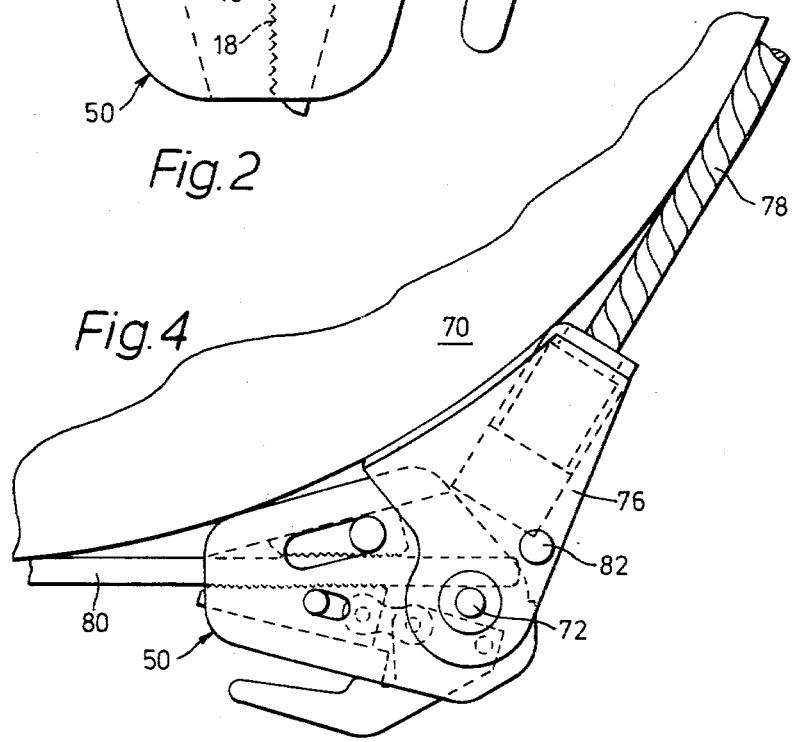

FIGS. 3 and 4 show how the dog 50 may be used with the capstan 70 of a wire drawing machine, of which only part of the capstan 70 is shown in the drawings.

In use, the capstan 70 rotates in the anti-clockwise direction, as viewed in FIGS. 3 and 4. The dog 50 is pivotally coupled by means of a pivot pin 72, extending through a hole 74 (FIG. 2) in the side plates 12, to a coupling member 76 which is connected by means of a wire cable 78 to an attachment point (not shown) on the capstan. As can be seen in FIGS. 3 and 4, the pivot pin 72 is positioned so as to be out of line with the end of a length of wire 80 gripped in the dog thereby increasing the extent to which the wire can be inserted. Because of this, the coupling member 76 is provided with a stop pin 82 which engages with the edge of the dog 50 when the cable 78 is pulling in a straight line with the wire 80 before the dog has come into engagement with the periphery of the capstan 70, as shown in FIG. 3. When, as shown in FIG. 4, the dog 50 comes into engagement with the periphery of the capstan 70, it pivots relative to the coupling member 76 about the pin 72 so that both dog and coupling member lie snugly against the periphery of the capstan.

As shown in FIG. 1, the dog 10 is also provided with holes 74 in its side members so that it can be coupled to the connecting member 76 in the same way as the dog 50.

I claim:

1. A releasable wire gripping device, for positive gripping of a wire, comprising a body portion, an opening in the body portion, a tapering passage within the body portion terminating in said opening, a wedge-shaped member slidable along said passage between a released position and a gripping position, two gripping surfaces disposed parallel to the axis of said passage, one of the gripping surfaces being provided on said wedge-shaped member, whereby a wire introduced into said passage through said opening when said wedge-shaped member is in its released position is gripped between the gripping surfaces when said wedge-shaped member is moved towards said opening into its gripping position, a lever operative to move said wedge-shaped member between its released and gripping positions, a pivotal mounting for the lever on the body portion, and coupling means operatively connecting the lever to said wedge-shaped member and so located relative to the pivotal mounting of the lever that, when the wedge-shaped member is in its gripping position, a thrust exerted on the wedge-shaped member towards said opening will tend to move the gripping surfaces closer together to increase their grip on the wire, and a thrust exerted on the wedge-shaped member away from said opening will not exert a couple on the lever in such a sense as to cause angular movement thereof to permit movement of the wedge-shaped member towards its released position.

2. A gripping device according to claim 1, further comprising a second wedge-shaped member slidable along said passage, the other gripping surface being provided on the second wedge-shaped member.

3. A gripping device according to claim 1, wherein the coupling means comprises a toggle link pivotally connected to both the lever and the wedge-shaped member.

4. A gripping device according to claim 1, wherein resilient means are provided to bias the wedge-shaped member towards its gripping position.

5. A gripping device according to claim 3, wherein resilient means is disposed between the toggle link and the wedge-shaped member.

6. A gripping device according to claim 3, wherein resilient means is disposed between the lever and the body portion.

7. A gripping device according to claim 6, wherein the lever is displaceable, relative to said body portion, in a direction transverse to the axis of pivoting of the lever on the body portion, said resilient means acting to bias the lever in said direction.

8. A gripping device according to claim 7, wherein said resilient means act between said lever and the pivotal mounting of the lever on the body portion.

9. A gripping device according to claim 4, wherein the resilient means comprises a stack of disc springs.

* * * * *